United States Patent
Walther

(10) Patent No.: US 9,046,121 B2
(45) Date of Patent: Jun. 2, 2015

(54) SCREW WITH DUAL EDGE ON THREAD

(75) Inventor: Mirco Walther, Thunder Bay (CA)

(73) Assignee: GRK CANADA LTD, Thunder Bay, Ontario (CA)

( * ) Notice: Subject to any disclaimer, the term of this patent is extended or adjusted under 35 U.S.C. 154(b) by 137 days.

(21) Appl. No.: 13/701,612

(22) PCT Filed: Jun. 7, 2011

(86) PCT No.: PCT/CA2011/000666
§ 371 (c)(1),
(2), (4) Date: Dec. 3, 2012

(87) PCT Pub. No.: WO2011/153619
PCT Pub. Date: Dec. 15, 2011

(65) Prior Publication Data
US 2013/0084144 A1 Apr. 4, 2013

(30) Foreign Application Priority Data

Jun. 10, 2010 (CA) .................................. 2707410

(51) Int. Cl.
*F16B 35/00* (2006.01)
*F16B 25/00* (2006.01)
(52) U.S. Cl.
CPC ........... *F16B 35/005* (2013.01); *F16B 25/0015* (2013.01); *F16B 25/0047* (2013.01)
(58) Field of Classification Search
USPC .................. 411/393, 411, 414, 417
IPC .............................................. F16B 33/02,39/30
See application file for complete search history.

(56) References Cited

U.S. PATENT DOCUMENTS

| | | | | |
|---|---|---|---|---|
| 422,307 | A * | 2/1890 | Libbey ......................... | 411/412 |
| 2,423,762 | A * | 7/1947 | Everett ......................... | 604/241 |
| 3,882,917 | A * | 5/1975 | Orlomoski ..................... | 411/309 |
| 3,901,066 | A * | 8/1975 | Orlomoski ..................... | 72/469 |
| 4,426,870 | A * | 1/1984 | Toropov et al. ................. | 72/118 |
| 4,764,067 | A * | 8/1988 | Kawashima .................. | 411/310 |
| 5,947,670 | A * | 9/1999 | Larson ........................ | 411/387.5 |
| 6,216,510 | B1 * | 4/2001 | Hashimoto .................... | 72/103 |
| 6,514,025 | B2 * | 2/2003 | Watanabe ...................... | 411/311 |
| 7,165,925 | B2 * | 1/2007 | Unsworth et al. ............. | 411/324 |

(Continued)

FOREIGN PATENT DOCUMENTS

| | | |
|---|---|---|
| CA | 2277476 A1 | 5/1999 |
| EP | 0425874 A1 | 5/1991 |
| FR | 2689944 A1 | 10/1993 |
| WO | 2011143733 | 11/2011 |

OTHER PUBLICATIONS

An International Search Report and Written Opinion, dated Sep. 21, 2011, issued in International Application No. PCT/CA2011/000666.

*Primary Examiner* — Gary Estremsky
(74) *Attorney, Agent, or Firm* — Lowe Hauptman & Ham LLP

(57) ABSTRACT

A screw fastener having a head, threaded shank with compound, divided threads and tip end has an upper thread surface extending at a substantially flat angle from a normal to a longitudinal axis of the screw which diverts upwardly to a first peripheral edge defining a cupped or concave upper thread surface and a lower thread surface extending upwardly to a second peripheral edge, with a radially inward recess between first and second edges. The screw exhibits significantly increased pull-out resistance.

22 Claims, 2 Drawing Sheets

(56) References Cited

U.S. PATENT DOCUMENTS

| | | | |
|---|---|---|---|
| 7,513,534 B2 * | 4/2009 | Noel et al. | 285/334 |
| 7,914,245 B2 * | 3/2011 | Lin et al. | 411/386 |
| 7,935,138 B1 * | 5/2011 | Richelsoph | 606/313 |
| 2003/0156921 A1 * | 8/2003 | Nagawa et al. | 411/411 |

* cited by examiner

SCREW WITH DUAL EDGE ON THREAD

RELATED APPLICATIONS

The present application is a National Stage of International Application No. PCT/CA2011/000666 filed Jun. 7, 2011 and claims priority from, Canadian Application No. 2,707,410 filed Jun. 10, 2010.

BACKGROUND OF THE INVENTION

The present invention pertains to a screw type fastener utilizable in substrates including lumber, LVL, particle board, wafer board, plastic lumber, cement board, plaster board and similar penetrable products. The screw has a substantially improved pull-out resistance in consequence of the unique thread design.

Self-tapping screws, such that the screws do not require a pilot hole, are typically employed in relation to penetrable substrates such as wood. Typically, the screws have a driving head, a threaded shank and a form of point at the tip of the screw to aid in penetration. While screws having a variety of apertured or notched threads are known for improved thread cutting during penetration, traditional threads have a thread profile which is substantially symmetrical about a normal from the shank access.

A major problem within the housing industry, and in particular wood framed housing, arises from wind uplift during high winds such as generated in hurricanes, typhoons, etc. Wind uplift applies pressure on sheathing materials which may be held to structural lumber by nails or screws. Various nail designs have been developed to improve holding capacity against wind uplift (i.e. against pull-out forces). While it is recognized that screws of a traditional design may well have equal or greater resistance to pull-out during uplift conditions than do nails, pull-out remains a problem.

One improvement in screw design and technology has been the recognition that a steeply sloping upper thread surface, such as employed in traditional wood screws, can permit substrate fibres to slide relative to the sloped thread surface during periods of intense axial tension, such as occurs in wind uplift on roofs and structures. Pull-out is facilitated by increased slope. One solution proposed is to reduce the slope on the upper thread face until almost "flat", or normal to the axis of the screw. Such a screw is disclosed in applicants' pending application, PCT/CA2010/000747, where the slope is minimized to within 0° to 3°

SUMMARY OF THE INVENTION

It is an object of the present invention to provide a novel thread design which increases pull-out resistance, particularly under wind uplift conditions.

In general terms, the invention provides a screw having a head end, an intermediate threaded shank and a pointed end wherein the screw thread has a relatively flat upper surface, and an outer peripheral edge which is bifurcated to effect dual edges, with the upper edge (facing the head) being separated from the lower edge (facing the tip) whereby the upper surface of the thread slopes upwardly towards the periphery. In this disclosure "flat" means generally normal to the axis of the screw, "upper" means facing towards the head of the screw; and "lower" means facing towards the tip.

BRIEF DESCRIPTION OF THE DRAWINGS

The invention will now be described by way of preferred and exemplary embodiments, with reference to the accompanying drawings which are diagrammatic, and not to scale.

DETAILED DESCRIPTION OF THE PREFERRED AND EXEMPLARY EMBODIMENTS

The screw of the present invention incorporates standard features of many screws including a driving head A, a shank B and a tip C. The head may have a multiple of shapes adapted for driving, such as wrench flats, slot, Phillips, torques, Robertson and other screwdriver formats. The shank may be fully threaded or only partially threaded over its length, and may contain additional specialized threads for scavenging cuttings or enabling penetration. The tip is usually pointed, and may be adapted with cutting facets to ease penetration.

Unique to the present inventive Eagle Thread™ screw is the thread profile, with the cross-section of the thread comprising a generally right angle triangle. The base of the triangular profile is parallel to the axis of the shank and the upper face (the face oriented towards the head) of the thread extends outwardly generally normal to the shank then turns upwardly to a first peripheral edge. The lower face of the thread (oriented towards the tip) is inclined from the base at an acute angle of substantially 30° to 40°, toward a second peripheral edge. The apex of the generally right angle triangle uniquely displays a bifurcated or divided crest, whereby a recess or gullet separates the first peripheral edge and the second peripheral edge. The apex displays divided, dual edges with the intervening gullet subtending an angle of about 30° to 35°. This thread profile results in the upper thread face being somewhat cupped to provide a first upwardly extending edge for increased pull-out resistance and a second edge for more traditional screw functionality. In the applicants' view, the inclined upper thread face produces a cupping action on fibres of the substrate (ie wood) to resist axial pull-out forces while the second thread edge provides the helical biting action to draw the screw into the substrate.

It is believed that the forming of a cupped upper thread surface increases the holding power of the screw and reduces any tendency of prior art sloped threads to "cam" or slip over the substrate fibres during excessive longitudinal forces which tend to pull a screw out of its substrate.

Figure 1:
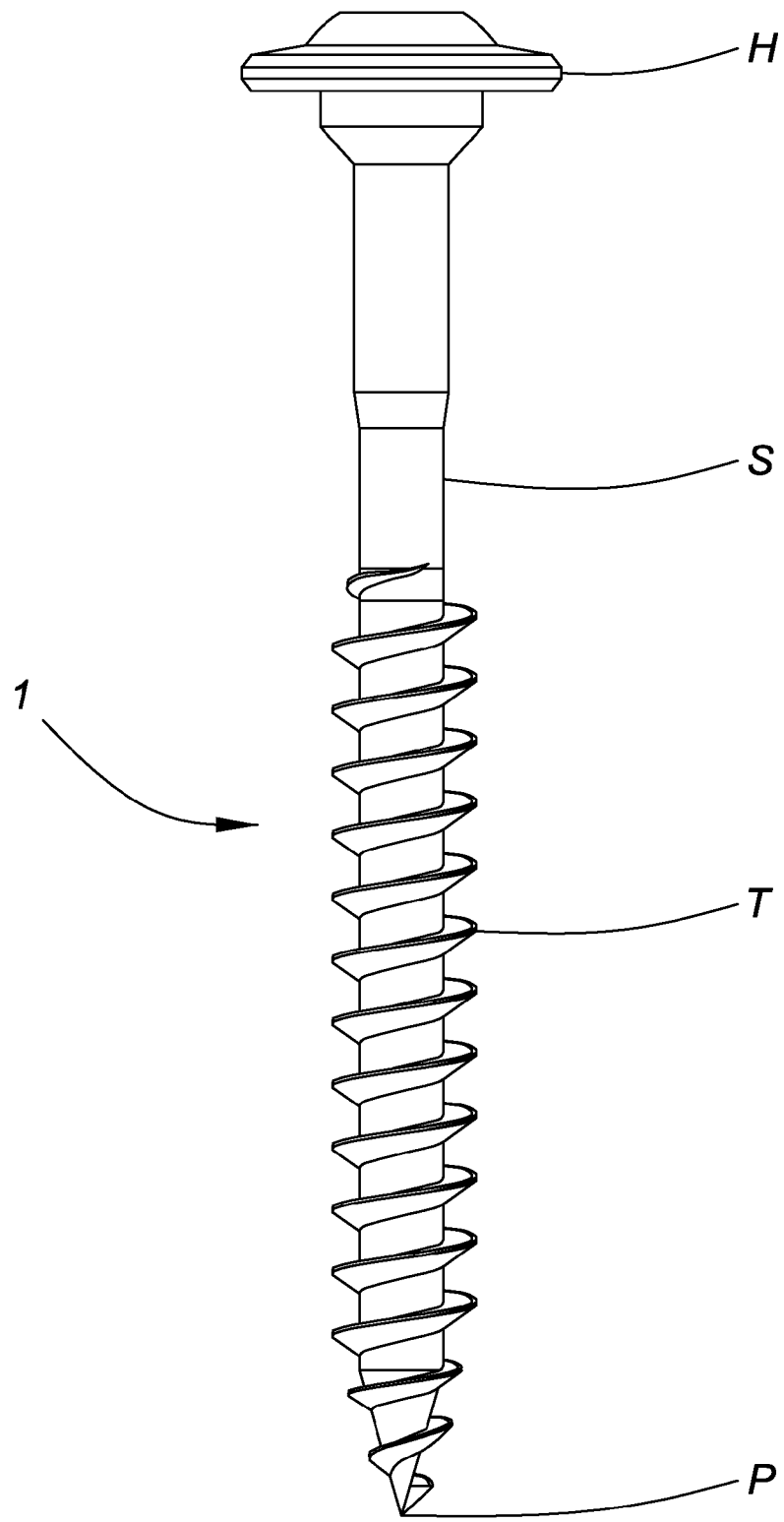
FIG. 1 is a side view of a screw according to the present invention.

FIG. 1 illustrates a screw 1 having an upper head portion H, an intermediate shank portion S, partially threaded at T, and a lower tip portion, tapering generally to a point P, with the threads embodying the configuration of the present invention.

Figure 2:
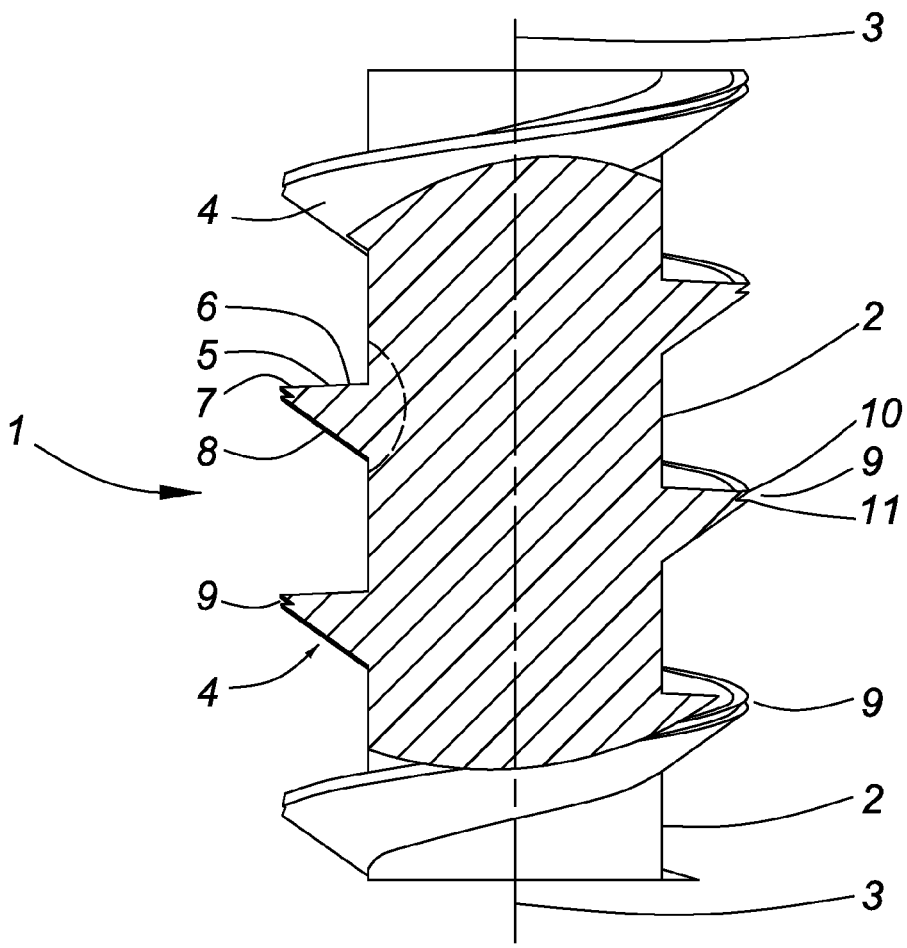
FIG. 2 is a detail of a section of the shank, showing the divided peripheral edge of the thread and its orientation.
Figure 3:
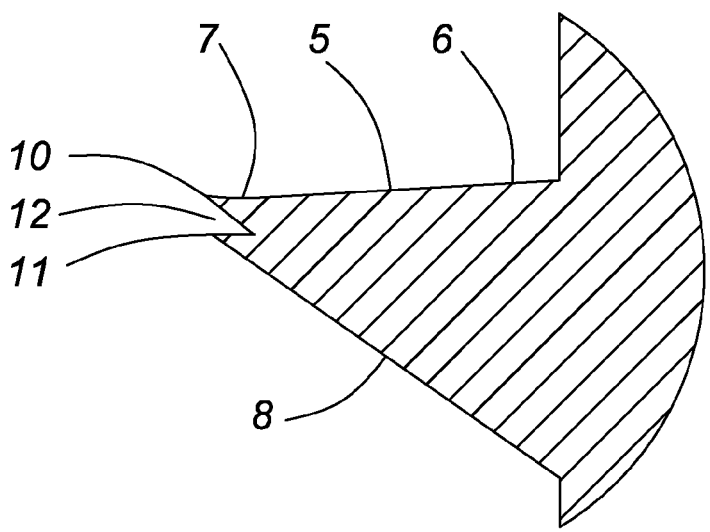
FIG. 3 is a magnified cross-section of a portion of the screw thread as shown in FIG. 2 and illustrating the bifurcated edge and the inclined portion of the upper surface of the thread

In FIG. 2, a detail of the thread configuration is shown wherein the screw shank 2 has a central axis 3 with threads 4 formed therearound. The upper thread face 5 is substantially normal or perpendicular to the thread axis 3 at its inner reaches 6 adjacent the shank (as seen in FIGS. 2 and 3). The inner reaches 6 of the upper thread face 5 may display a minor angular variation ranging from 0° to 3° from the normal in a direction away from the head portion. Preferably the outer extremity 7 of upper face 5 diverts upwardly to form a cupped or concave upper face on the thread, but may be normal to the axis. The lower thread face 8 is at an acute angle relative to the shank axis and merges with the upper thread face at a bifurcated apex 9, forming an upper thread peripheral edge 10 and a lower peripheral edge 11, with an intermediate gullet or recess 12, as may be more clearly seen in FIG. 3. The gullet 12 is generally 'V' shaped and extends inwardly towards to shank at least as far as the extent of the inclined outer portion 7.

While the upper face 5 of the screw thread may have an inner portion 6 sloping downwardly from 0° to 3°, the relatively upward inclination of outer portion 7 of the thread produces a relatively cupped or upwardly inclined surface While conventional screws have an upper surface typically in the range of 20° to 30° away from the screw head, the application of a cupped upper thread face to a screw thread has significant increase in pull-out resistance, and has particular advantages in applications requiring axial integrity. This is particularly advantageous in applications where wind uplift, such as during hurricanes, applies extreme tension against the screw head and resistance to pull-out is critical. The combination of the dual edges 10 and 11 provides the increased resistance to pull-out, together with a more conventional lower thread to ensure good driving capability.

In an exemplary 2 inch/5 cm. screw of the type disclosed, the shank S may be 3.3 mm in diameter, while the upper thread surface 5 is about 0.90 mm in total width, including the inclined portion 7 about 0.1 mm and the gullet 12 about 0.2 mm deep. The angle subtended at the first peripheral edge is less than 33 degrees.

The foregoing embodiments have been described in relation to conventional wood screws, the invention can be applied to screws for other applications including, without limitation, metal or plastic applications. Minor variation in degrees or length can be made without departing from the scope of the invention as recited in the accompanying claims. Further, while the Eagle Thread™ screw threads of the present invention may be applied to the entire length of the threaded portion, a more conventional or symmetric thread cross-section may be employed over a portion of the threaded length and particularly may be used in the tip portion, having a conical reduction to a pointed end. Additionally, other elements providing specific advantages to screw functionality may be added, such as "W-cut" notches, or reinforced shank to head transition.

The invention claimed is:

1. A screw fastener comprising:
   a head adapted for receiving driving means at an upper end;
   an elongated shank extending from the head to a tip at a lower end, the shank having a central axis and having helical threads extending outwardly from the shank over at least a portion of the length of the shank;
   the threads having upper and lower thread faces converging at an acute angle to a pair of spaced compound peripheral first and second edges defining a radial recess between the first and second edges, an inner portion of the upper thread face adjacent to the shank being substantially normal to the axis of the shank, said upper face further having an upwardly inclined outer portion extending to the first peripheral edge, and the lower thread face subtending an acute angle of 30° to 40° with the upper thread face, extending to the second peripheral edge.

2. The screw of claim 1 wherein the recess between the first and second peripheral edges is generally 'V' shaped and converges with respective upper and lower thread faces at acute angles.

3. A screw fastener comprising a head with drive means at one end;
   a shank extending from the head at an upper end to a tip at the other end, the shank having helical threads and a central longitudinal axis,
   wherein the helical thread in cross-section has a generally flat upper surface generally normal to the centrally longitudinal axis, terminating in a first peripheral edge, and an acutely inclined lower surface extending upwardly towards a second peripheral edge spaced from the first peripheral edge by an inwardly extending recess that extends to each edge.

4. The screw of claim 3 wherein the flat upper surface has a relatively upwardly inclined outer portion.

5. The screw of claim 3 wherein the recess is as deep as the extent of an upwardly inclined outer portion.

6. The screw of claim 3 wherein the angle subtended at the first peripheral edge is less than 35 degrees.

7. The screw fastener of claim 3 wherein the generally flat upper surface extends substantially perpendicularly from the shank.

8. The screw fastener of claim 3 wherein a surface of the second peripheral edge is substantially parallel to the generally flat upper surface.

9. The screw fastener of claim 3, wherein:
   the top surface extends in a direction that is almost normal to the central longitudinal axis.

10. The screw fastener of claim 3, wherein:
    the top surface extends in a direction that is from zero degrees to three degrees in slope relative to a direction that is normal to the central longitudinal axis.

11. The screw fastener of claim 3, wherein:
    an outer portion of the threads has a relatively upwardly inclination.

12. The screw fastener of claim 11, wherein:
    the bottom surface extends away from the central longitudinal axis at an angle closer to 45 degrees than zero degrees relative to the direction that is normal to the central longitudinal axis.

13. The screw fastener of claim 3, wherein:
    the bottom surface extends away from the central longitudinal axis at an angle that is substantially greater than that of the upper surface.

14. The screw fastener of claim 3, wherein:
    the upper surface forms a cupped surface.

15. The screw fastener of claim 3, wherein:
    the generally flat upper surface extends a distance that extends from the shaft and terminates at the first peripheral edge.

16. A screw comprising:
    a head; and
    a shank extending from the head, the shank including a helical thread and a central longitudinal axis, wherein
    the thread has a top surface facing in the direction of the head, and
    the top surface extends in a direction that is substantially normal to the central longitudinal axis, and at least one of:
    (i) the upper surface forms a cupped surface; or
    (ii) a bifurcated edge of the thread has an upper inner surface and a lower inner surface, the upper inner surface being the surface closest to the head of the screw and the lower inner surface is substantially parallel to the top surface of the thread.

17. The screw of claim 16, wherein:
    the top surface extends in a direction that is almost normal to the central longitudinal axis.

18. The screw of claim 16, wherein:
    the top surface extends in a direction that is from zero degrees to three degrees in slope relative to a direction that is normal to the central longitudinal axis.

19. The screw of claim 18, wherein:

the thread has a bottom surface that faces away from the head, the bottom surface extends away from the central longitudinal axis at an angle closer to 45 degrees than zero degrees relative to the direction that is normal to the central longitudinal axis.

20. The screw of claim 16, wherein:

an outer portion of the thread has a relatively upwardly inclination.

21. The screw of claim 16, wherein:

the thread has a bottom surface that faces away from the head, the bottom surface extends away from the central longitudinal axis at an angle that is substantially greater than that of the upper surface.

22. The screw of claim 16, wherein an edge of the thread distal from the shaft is bifurcated.

\* \* \* \* \*